US012386303B2

(12) United States Patent
Inui et al.

(10) Patent No.: US 12,386,303 B2
(45) Date of Patent: Aug. 12, 2025

(54) CHARGE ELIMINATING APPARATUS AND IMAGE FORMING SYSTEM

(71) Applicant: CANON KABUSHIKI KAISHA, Tokyo (JP)

(72) Inventors: Yuma Inui, Ibaraki (JP); Shingo Iwami, Tokyo (JP); Koji Suzuki, Chiba (JP); Keisuke Mogi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/426,944

(22) Filed: Jan. 30, 2024

(65) Prior Publication Data

US 2024/0255887 A1 Aug. 1, 2024

(30) Foreign Application Priority Data

Jan. 30, 2023 (JP) ................................ 2023-011454

(51) Int. Cl.
*G03G 15/00* (2006.01)
*B65H 37/00* (2006.01)
*G03G 21/20* (2006.01)

(52) U.S. Cl.
CPC ......... *G03G 15/6573* (2013.01); *B65H 37/00* (2013.01); *G03G 21/206* (2013.01); *B65H 2301/5133* (2013.01); *G03G 2215/00417* (2013.01)

(58) Field of Classification Search
None
See application file for complete search history.

(56) References Cited

U.S. PATENT DOCUMENTS

2021/0216027 A1* 7/2021 Tanaka ............... G03G 15/6573

FOREIGN PATENT DOCUMENTS

| | | | | |
|---|---|---|---|---|
| JP | 2015054755 | A | | 3/2015 |
| JP | 2016110780 | A | | 6/2016 |
| JP | 2017090564 | A | * | 5/2017 |
| JP | 2017156385 | A | | 9/2017 |
| JP | 2019167169 | A | | 10/2019 |

OTHER PUBLICATIONS

English translation of JP 2017-090564 A to Kawabata et al., publication date May 25, 2017. (Year: 2017).*

* cited by examiner

*Primary Examiner* — Leslie J Evanisko
(74) *Attorney, Agent, or Firm* — Canon U.S.A., Inc. IP Division

(57) ABSTRACT

A charge eliminating apparatus includes a conveyance path configured to convey a sheet with an image formed thereon by an image forming apparatus, a non-contact charge eliminating device having an ion generation unit configured to generate ions and a control unit configured to control the ion generation unit, the non-contact charge eliminating device being configured to remove charges from the sheet conveyed in the conveyance path in a non-contact state, a surrounding member configured to surround the control unit, a separating portion configured to separate a first space where the control unit is surrounded by the surrounding member and a second space where the ion generation unit is disposed, and a fan configured to generate an air flow in the first space.

16 Claims, 7 Drawing Sheets

CHARGE ELIMINATING APPARATUS AND IMAGE FORMING SYSTEM

BACKGROUND

Field of the Disclosure

The present disclosure relates to a charge eliminating apparatus for charge eliminating a sheet with an image formed thereon by an image forming apparatus.

Description of the Related Art

In an image forming system, a sheet electrostatically adsorbed to a sheet guide may cause a conveyance failure, or electrostatic force generated between sheets may cause a stacking failure of sheets when the sheet is discharged out of an apparatus.

To avoid such an issue, there has been proposed a charge eliminating apparatus as discussed in Japanese Patent Application Laid-Open No. 2019-167169. The charge eliminating apparatus disclosed in Japanese Patent Application Laid-Open No. 2019-167169 includes two types of charge eliminating devices, such as a contact charge eliminating device in contact with a conveyed sheet and a non-contact charge eliminating device disposed downstream of the contact charge eliminating device in the conveyance direction.

However, a non-contact charge eliminating device may possibly be subjected to an operation failure due to the temperature rise of the non-contact charge eliminating device.

SUMMARY

According to an aspect of the present disclosure, a charge eliminating apparatus includes a conveyance path configured to convey a sheet with an image formed thereon by an image forming apparatus, a non-contact charge eliminating device having an ion generation unit configured to generate ions and a control unit configured to control the ion generation unit, the non-contact charge eliminating device being configured to remove charges from the sheet conveyed in the conveyance path in a non-contact state, a surrounding member configured to surround the control unit, a separating portion configured to separate a first space where the control unit is surrounded by the surrounding member and a second space where the ion generation unit is disposed, and a fan configured to generate an air flow in the first space.

Further features of various embodiments of the present disclosure will become apparent from the following description of exemplary embodiments with reference to the attached drawings.

DESCRIPTION OF THE EMBODIMENTS

An exemplary embodiment of the present disclosure will be described below with reference to the accompanying drawings. Dimensions, materials, shapes, relative arrangements, and the like of components described in the following embodiments are not intended to limit the scope of the present technology only thereto unless otherwise specified.

Image Forming System

Figure 6:
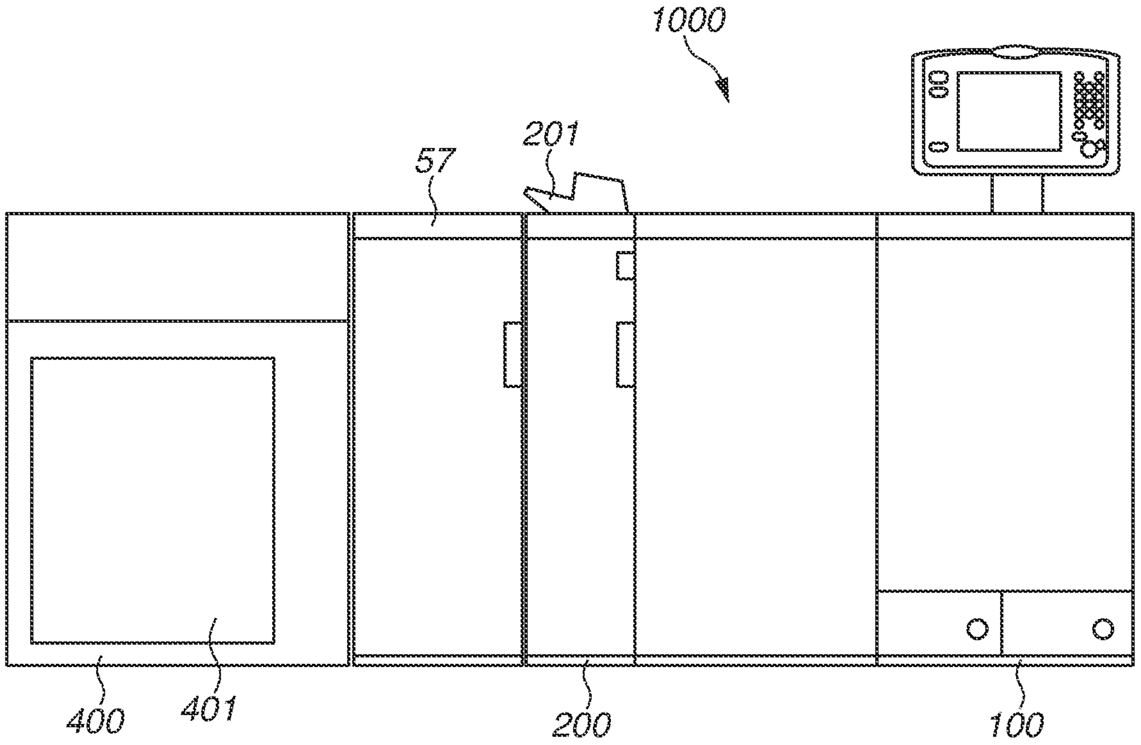
FIG. 6 schematically illustrates an image forming system.

FIG. 6 illustrates an overall hardware configuration of an image forming system 1000 according to the present exemplary embodiment. The image forming system 1000 includes an image forming apparatus 100, an inserter 200, a charge eliminating apparatus 57, and a large-capacity stacker 400. The image forming apparatus 100 forms an image on a sheet based on an instruction from an external apparatus. The inserter 200 conveys the sheet conveyed from the image forming apparatus 100 to the charge eliminating apparatus 57. The inserter 200 also feeds a sheet inserted from a feed tray 201 and inserts the sheet between a plurality of sheets conveyed from the image forming apparatus 100.

The charge eliminating apparatus 57 discharges the sheet conveyed from the image forming apparatus 100 via the inserter 200. The large-capacity stacker 400 stacks a large amount of sheets conveyed from the charge eliminating apparatus 57. The sheet conveyed from the image forming apparatus 100 through the inserter 200 and the charge eliminating apparatus 57 is discharged to a discharge tray 401 of the large-capacity stacker 400.

Although the image forming system 1000 according to the present exemplary embodiment includes the image forming apparatus 100, the inserter 200, the charge eliminating apparatus 57, and the large-capacity stacker 400, the configuration of the image forming system 1000 is not limited thereto. For example, the image forming system 1000 may include another finisher downstream of the large-capacity stacker 400. In the image forming system 1000, the charge eliminating apparatus 57 may be directly connected with the image forming apparatus 100, and the inserter 200 or the large-capacity stacker 400 may not be provided. In the image forming system 1000, the charge eliminating apparatus 57 may be integrally provided in a housing 110 (FIG. 1) of the image forming apparatus 100.

Image Forming Apparatus

Figure 1:
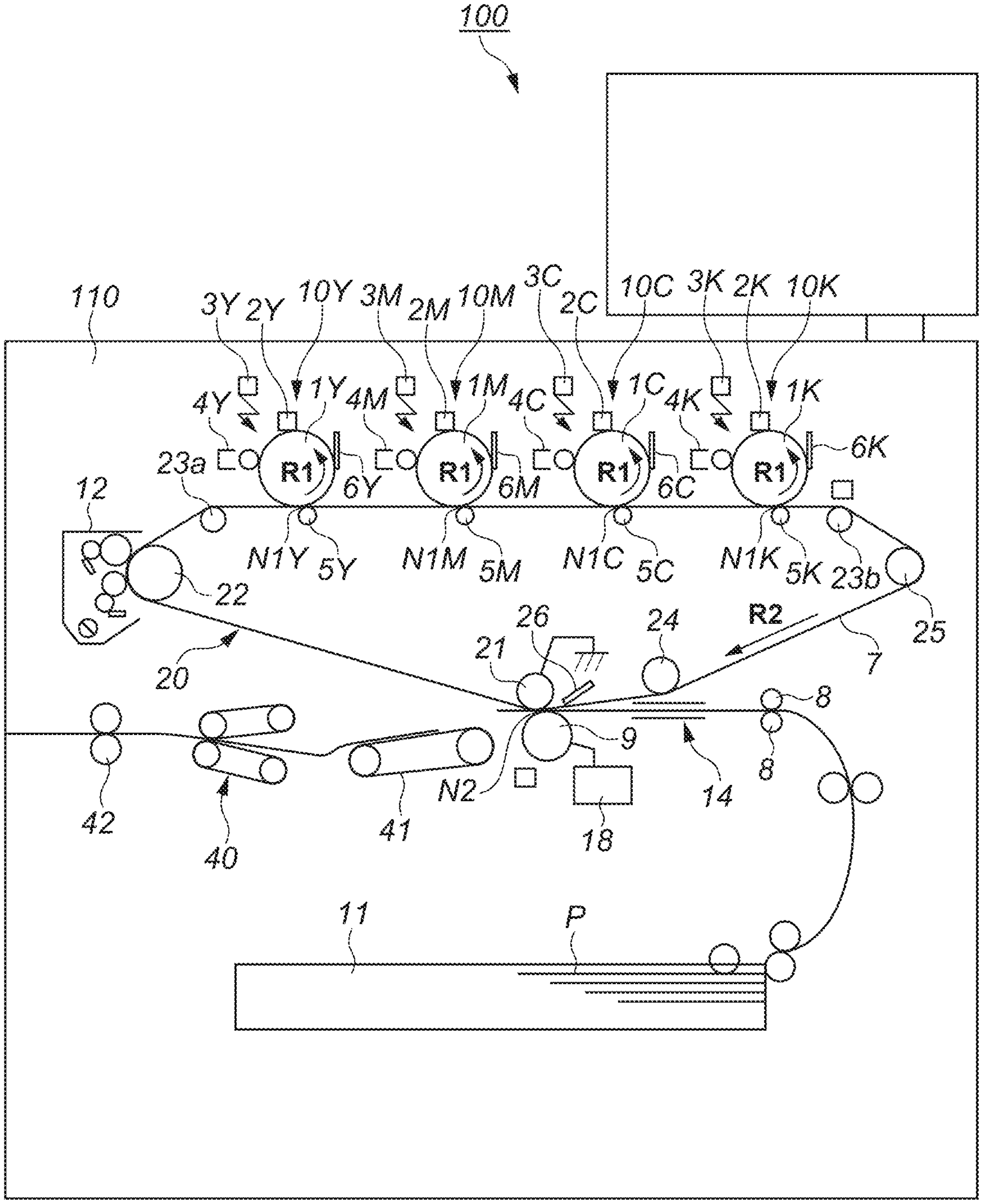
FIG. 1 schematically illustrates an image forming apparatus.

FIG. 1 is a cross-sectional view schematically illustrating the image forming apparatus 100. The image forming apparatus 100 according to the present exemplary embodiment is a tandem type multifunction peripheral (having functions of a copying machine, a printer, and a facsimile apparatus) employing an intermediate transfer method. For example, the image forming apparatus 100 can form a full-color image on a sheet P (e.g., transfer material, sheet material, recording medium, and other media), such as paper, by using an electrophotographic method according to an image signal transmitted from an external apparatus.

The image forming apparatus 100 includes a plurality of image forming units (stations), i.e., four different image forming units 10Y, 10M, 10C, and 10K for forming a yellow (Y) image, a magenta (M) image, a cyan (C) image, and a black (K) image, respectively. The image forming units 10Y, 10M, 10C, and 10K are disposed in a row along the moving direction of an image transfer surface on an intermediate transfer belt 7 (described below), which is approximately horizontally disposed. Elements having an identical or corresponding function or configuration in the image forming units 10Y, 10M, 10C, and 10K may be comprehensively described below. In this case, trailing letters "Y", "M", "C", and "K" of reference numerals indicating respective colors may be omitted. The image forming unit 10 includes photosensitive drums 1 (1Y, 1M, 1C, and 1K), charging devices 2 (2Y, 2M, 2C, and 2K), exposure devices 3 (3Y, 3M, 3C, and 3K), developing devices 4 (4Y, 4M, 4C, and 4K), primary transfer rollers 5 (5Y, 5M, 5C, and 5K), and cleaning devices 6 (6Y, 6M, 6C, and 6K).

The photosensitive drum 1 for carrying a toner image is rotatably driven in the direction of the arrow R1 in FIG. 1 (counterclockwise direction) by a driving force transmitted from a drum drive motor (not illustrated). The surface of the rotating photosensitive drum 1 is uniformly charged to a predetermined potential having a predetermined polarity (negative polarity according to the present exemplary embodiment) by the charging device 2 (charging unit). In the charge process, the charging device 2 is applied with a predetermined charge voltage by a charging power source (not illustrated). The surface of the charged photosensitive drum 1 is subjected to scanning exposure by the exposure device 3 (exposure unit) according to an image signal, and an electrostatic latent image is formed on the photosensitive drum 1. According to the present exemplary embodiment, the exposure device 3 includes a laser scanner device for irradiating the photosensitive drum 1 with a laser beam modulated according to image information. An electrostatic image formed on the photosensitive drum 1 is supplied with toner (developer) to be developed by the developing device 4 (developing unit), and a toner image is formed on the photosensitive drum 1. According to the present exemplary embodiment, toner charged to the same polarity as the charging polarity of the photosensitive drum 1 adheres to exposure portions on the photosensitive drum 1 which have been uniformly charged and then exposed to provide low absolute potential values. The developing device 4 includes a developing roller serving as a rotatable developer carrier for conveying the developer to the developing position facing the photosensitive drum 1. The developing roller is rotatably driven by a driving force transmitted from, for example, the drive system of the photosensitive drum 1. In the development process, the developing roller is applied with a predetermined developing voltage by a developing power source (not illustrated).

The intermediate transfer belt 7, a rotatable intermediate transfer member formed of an endless belt, is disposed to face the four photosensitive drums 1Y, 1M, 1C, and 1K. The intermediate transfer belt 7 functions as a second image carrier for carrying a toner image. The intermediate transfer belt 7 is wound around a plurality of support rollers and stretched with a predetermined tension. The plurality of support rollers includes a drive roller 22, an upstream auxiliary roller 23*a*, a downstream auxiliary roller 23*b*, a tension roller 25, a secondary pre-transfer roller 24, and an inner roller 21. The drive roller 22 transmits a driving force to the intermediate transfer belt 7. The tension roller 25 applies a predetermined tension to the intermediate transfer belt 7 to maintain a constant tension of the intermediate transfer belt 7. The secondary pre-transfer roller 24 forms the surface of the intermediate transfer belt 7 in the vicinity of the upstream of a secondary transfer nip N2 in the rotational direction of the intermediate transfer belt 7. The inner roller 21 functions as a counter member of an outer roller 9. The upstream auxiliary roller 23*a* and the downstream auxiliary roller 23*b* form the image transfer surface, which is substantially horizontally disposed. The drive roller 22 is rotatably driven by a driving force transmitted from a belt drive motor (not illustrated). The intermediate transfer belt 7 is thereby driven by the drive roller 22 to rotate in the direction of the arrow R2 in FIG. 1 (clockwise rotation). According to the present exemplary embodiment, the intermediate transfer belt 7 is rotatably driven with a circumferential speed of 150 to 470 mm/sec. The plurality of support rollers other than the drive roller 22 are driven to rotate according to the rotation of the intermediate transfer belt 7. The inner circumferential surface of the intermediate transfer belt 7 is provided with the primary transfer rollers 5Y, 5M, 5C, and 5K that correspond to the photosensitive drums 1Y, 1M, 1C, and 1K, respectively. The primary transfer rollers 5Y, 5M, 5C, and 5K are roller-shaped primary transfer members as primary transfer units. The primary transfer roller 5 presses the intermediate transfer belt 7 toward the photosensitive drum 1 to form a primary transfer nip N1 (N1Y, N1M, N1C, and N1K) (primary transfer portion) as a contact point between the photosensitive drum 1 and the intermediate transfer belt 7. The inner circumferential surface of the intermediate transfer belt 7 is provided with a pressing member 26 upstream of the inner roller 21 and downstream of the secondary pre-transfer roller 24 in the rotational direction of the intermediate transfer belt 7. The pressing member 26 comes into contact with the inner circumferential surface of the intermediate transfer belt 7 to press the intermediate transfer belt 7 from the inner circumferential surface to the outer circumferential surface.

The toner image formed on the photosensitive drum 1 in this way is primarily transferred onto the rotating intermediate transfer belt 7 at the primary transfer nip N1 by the action of the primary transfer roller 5.

In the primary transfer process, the primary transfer roller 5 is applied with a primary transfer voltage (direct-current (DC) voltage) by a primary transfer power source (not illustrated). This voltage has the polarity (positive polarity according to the present exemplary embodiment) opposite to the normal charging polarity of the toner. In the full-color image forming process, for example, a yellow toner image, a magenta toner image, a cyan toner image, and a black toner image formed on the photosensitive drums 1 are primarily transferred sequentially onto the intermediate transfer belt 7 so that these images are superimposed in the same image forming region. According to the present exemplary embodiment, the primary transfer nip N1 is located at the image forming position where a toner image is formed on the intermediate transfer belt 7. The intermediate transfer belt 7 is an example of a rotatable endless belt for conveying the toner image carried at the image forming position.

The outer circumferential surface of the intermediate transfer belt 7 is provided with the outer roller 9 (secondary transfer unit) at the position facing the inner roller 21. The outer roller 9 is pressed toward the inner roller 21 via the intermediate transfer belt 7 to form a secondary transfer nip N2 (secondary transfer portion) as a contact point between the intermediate transfer belt 7 and the outer roller 9. At the secondary transfer nip N2, the toner image formed on the intermediate transfer belt 7 in this way is secondarily transferred onto the sheet P by the action of the outer roller 9. The sheet P is conveyed while being pinched by the intermediate transfer belt 7 and the outer roller 9. In the secondary transfer process, the outer roller 9 is applied with a secondary transfer voltage (DC voltage) by a secondary transfer power source 18. This voltage is subjected to constant-voltage control and has the polarity (positive polarity according to the present exemplary embodiment) opposite to the normal charging polarity of the toner. According to the present exemplary embodiment, for example, when a secondary transfer voltage of +1 to +7 kV is applied to the outer roller 9, a secondary transfer current of +40 to +120 μA is applied thereto. The toner image on the intermediate transfer belt 7 is thereby secondarily transferred onto the sheet P. According to the present exemplary embodiment, the inner roller 21 is electrically grounded (connected to ground).

The inner roller 21 may also be used as a secondary transfer member. In this case, the inner roller 21 is applied with the secondary transfer voltage having the same polarity as the normal charging polarity of the toner, and the outer roller 9 may be electrically grounded to be used as an opposed electrode.

The sheet P is conveyed to the secondary transfer nip N2 in synchronization with the toner image on the intermediate transfer belt 7. More specifically, the sheet P stored in a recording material cassette 11 as a recording material storage unit is conveyed to a registration roller pair 8 by a feed roller and then temporarily stopped. The registration roller pair 8 is then rotatably driven to feed the sheet P to the secondary transfer nip N2 so that the toner image on the intermediate transfer belt 7 coincides with the desired image forming region on the sheet P. A conveyance guide 14 for guiding the sheet P to the secondary transfer nip N2 is provided downstream of the registration roller pair 8 and upstream of the secondary transfer nip N2 in the sheet P conveyance direction.

The sheet P with a toner image transferred thereon is conveyed to a fixing device 40 (fixing unit) by a pre-fixing conveyance unit 41. In the process of conveying the sheet P carrying the non-fixed image while pinching the sheet P with a fixing rotary member pair, the fixing device 40 heats and pressurizes the sheet P (melting and bonding process) to fix the toner image onto the surface of the sheet P. Thereafter, the sheet P with the toner image fixed thereon is conveyed to the inserter 200 by an outlet roller pair 42.

Meanwhile, the toner remaining on the photosensitive drum 1 after the primary transfer process is removed from the photosensitive drum 1 and collected by a cleaning device 6 (cleaning unit). Residual toner on the intermediate transfer belt 7 and paper dust and other substances adhering thereto from the sheet P after the secondary transfer process are removed from the intermediate transfer belt 7 and collected by a belt cleaning device 12 (intermediate transfer member cleaning unit). According to the present exemplary embodiment, the belt cleaning device 12 electrostatically collects the adhering substances, such as secondary transfer residual toner, on the intermediate transfer belt 7 to clean the intermediate transfer belt 7.

According to the present exemplary embodiment, the intermediate transfer belt 7 (which is stretched by the plurality of support rollers), the primary transfer rollers 5, the belt cleaning device 12, and frames for supporting these parts form an intermediate transfer belt unit 20 as a belt conveyance unit. The intermediate transfer belt unit 20 is supported to be attachable to and detachable from the housing 110 of the image forming apparatus 100 for maintenance or parts replacement. The intermediate transfer belt 7 may be formed of a single- or multi-layer structure made of a resin material, or a multi-layer structure having elastic layers made of an elastic material.

According to the present exemplary embodiment, the primary transfer roller 5 is formed of a metallic core and an elastic layer made of ion conductive foam rubber wrapped around the metallic core. According to the present exemplary embodiment, the primary transfer roller 5 has an outer diameter of 15 to 20 mm and an electrical resistance of $1\times10^5$ to $1\times10^8\Omega$ measured when applied with a 2 kV voltage in an environment with 23° C. and 50% RH.

According to the present exemplary embodiment, the outer roller 9 is formed of a metallic core and an elastic layer made of ion conductive foam rubber wrapped around the metallic core. According to the present exemplary embodiment, the outer roller 9 has an outer diameter of 20 to 25 mm and an electrical resistance of $1\times10^5$ to $1\times10^8\Omega$ measured when applied with a 2 kV voltage in an environment with 23° C. and 50% RH. The outer roller 9 comes into contact with the inner roller 21 across the intermediate transfer belt 7 with a predetermined pressure to form the secondary transfer nip N2.

According to the present exemplary embodiment, the inner roller 21 is formed of a metallic core and an elastic layer made of electronic conductive rubber wrapped around the metallic core. According to the present exemplary embodiment, the inner roller 21 has an outer diameter of 20 to 22 mm and an electrical resistance of $1\times10^5$ to $1\times10^8\Omega$ measured when applied with a 50 V voltage in an environment with 23° C. and 50% RH. The secondary pre-transfer roller 24 can be configured, for example, in a similar way to the inner roller 21. According to the present exemplary embodiment, the rotation axis directions of the support rollers of the intermediate transfer belt 7 including the inner roller 21 and the rotation axis direction of the outer roller 9 are approximately parallel to each other.

Overview of Charge Eliminating Apparatus

Figure 2:
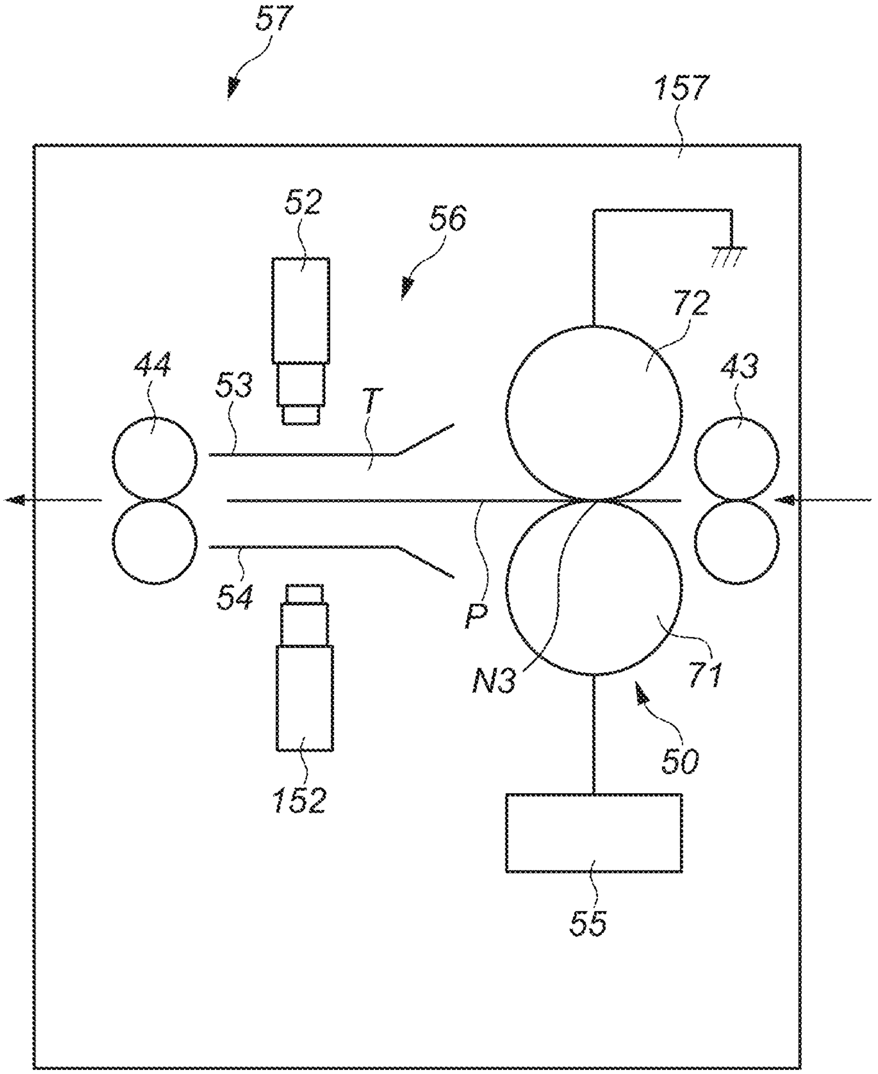
FIG. 2 schematically illustrates a charge eliminating apparatus.

The charge eliminating apparatus 57 according to the present exemplary embodiment will now be described with reference to FIG. 2. FIG. 2 is a cross-sectional view schematically illustrating the charge eliminating apparatus 57. In the image forming system 1000, the charge eliminating apparatus 57 is disposed downstream of the image forming apparatus 100 and the inserter 200. The sheet P may be charged in the above-described image forming process of the image forming apparatus 100. In such a case, a plurality of sheets P discharged to the discharge tray 401 sticks to each other by static electricity, possibly resulting in a stacking failure. According to the present exemplary embodiment, the charge eliminating apparatus 57 is therefore configured to remove charges from the sheet P with an image formed thereon by using the image forming apparatus 100.

The charge eliminating apparatus 57 includes, inside a housing 157, a charge eliminating roller pair 50 (contact charge eliminating device) for removing electric charges from the sheet P while in contact with the sheet P, and a non-contact charge eliminating unit 56 for removing electric charges from the sheet P without being in contact with the sheet P. The charge eliminating apparatus 57 also includes an inlet roller pair 43 for receiving the sheet P from the inserter 200 and conveying the sheet P along a conveyance path T, and an outlet roller pair 44 for discharging the sheet P subjected to the charge elimination by using the charge eliminating roller pair 50 and the non-contact charge eliminating unit 56, to a large-capacity stacker 400. The inlet roller pair 43 and the outlet roller pair 44 are examples of the conveyance units according to the present exemplary embodiment.

The charge eliminating roller pair 50 includes a charge eliminating roller 71 rotating while in contact with the lower surface of the sheet P, and a charge eliminating counter roller 72 rotating while in contact with the upper surface of the sheet P. The charge eliminating counter roller 72 is an example of a first charge eliminating roller, and the charge eliminating roller 71 is an example of a second charge eliminating roller. The charge eliminating roller 71 is formed of a metallic core and an elastic layer made of ion conductive foam rubber wrapped around the metallic core. According to the present exemplary embodiment, the charge eliminating roller 71 has an outer diameter of 20 to 25 mm and an electrical resistance of 1×10 to $1\times10^{8}\Omega$ measured when applied with a 2 kV voltage in an environment with 23° C. and 50% RH. The charge eliminating roller 71 is a similar member to the above-described outer roller 9. The charge eliminating counter roller 72 having an outer diameter of 20 to 25 mm forms a charge eliminating nip portion with the charge eliminating roller 71. The sheet P conveyed from the image forming apparatus 100 is initially subjected to coarse charge eliminating at the charge eliminating nip portion N3 formed by the charge eliminating roller pair 50. The charge eliminating roller 71 is applied with a charge eliminating voltage (DC voltage) by a charge eliminating power source 55 as a charge eliminating high-voltage application unit. This voltage is subjected to constant-voltage control and has the polarity (negative polarity according to the present exemplary embodiment) opposite to the polarity of the secondary transfer member (outer roller 9). The sheet P having passed through the charge eliminating roller pair 50 is then subjected to charge elimination that is performed by the non-contact charge eliminating unit 56 disposed downstream of the charge eliminating roller pair 50. The non-contact charge eliminating unit 56 removes electric charges on the sheet P which have not been removed by charge elimination performed by the charge eliminating roller pair 50. The non-contact charge eliminating unit 56 includes a first ionizer 52 (non-contact charge eliminating device) disposed above the conveyed sheet P and includes a second ionizer 152 disposed below the sheet P. The non-contact charge eliminating unit 56 further includes a first conveyance guide 53 and a second conveyance guide 54 disposed below the first conveyance guide 53. The non-contact charge eliminating unit 56 further includes surrounding members 62 and 162 (described below, see FIGS. 4 and 5), sealing members 63 and 163 as separating portions, resin sheets 64 and 164, a first fan 65, and a second fan 165. Also, the non-contact charge eliminating unit 56 may include the first conveyance guide 53, the second conveyance guide 54, the first ionizer 52 disposed above the sheet P, the surrounding member 62, the sealing member 63, the resin sheet 64, and the first fan 65. Likewise, the non-contact charge eliminating unit 56 may include the first conveyance guide 53, the second conveyance guide 54, the second ionizer 152 disposed below the sheet P, the surrounding member 162, the sealing member 163, the resin sheet 164, and the second fan 165.

Figure 3B:
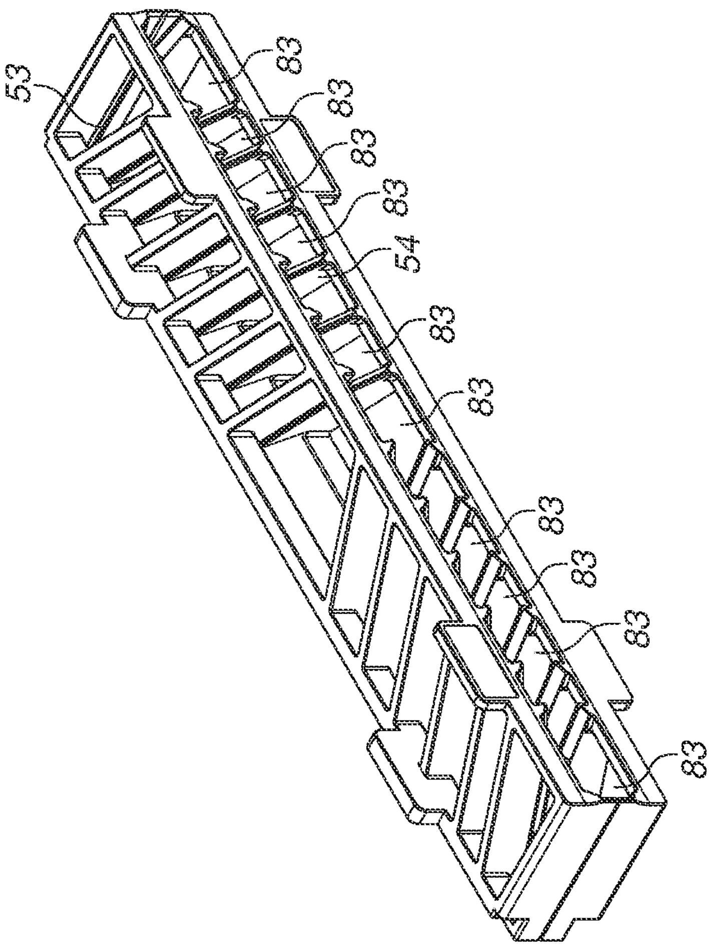
FIGS. 3A and 3B schematically illustrate a conveyance guide.
Figure 3A:
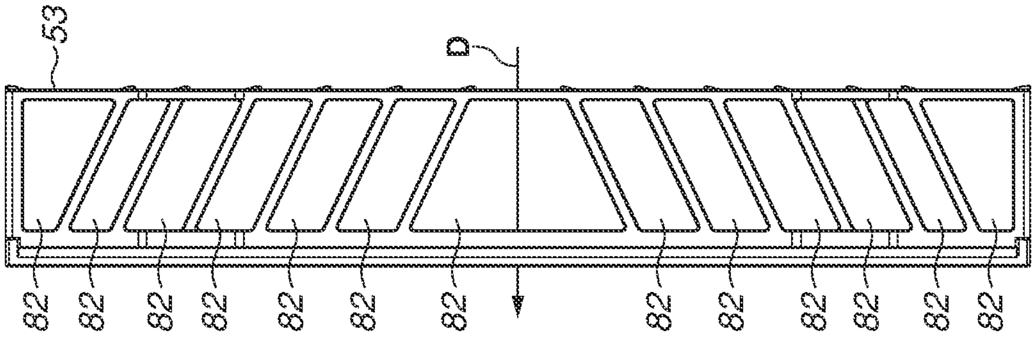

FIG. 3A is a top view illustrating the first conveyance guide 53. FIG. 3B is a perspective view illustrating the first conveyance guide 53 and the second conveyance guide 54. The first conveyance guide 53 is provided with an opening 82 so that the ions generated by ion generation units 61 (electrode needles) of the first ionizer 52 can reach the conveyed sheet without being physically blocked. Like the first conveyance guide 53, the second conveyance guide 54 is provided with an opening 83 so that the ions generated by ion generation units 161 (electrode needles) of the second ionizer 152 can reach the conveyed sheet without being physically blocked.

The sheet conveyed by the image forming apparatus 100 is subjected to coarse charge eliminating by the charge eliminating roller pair 50. As described above, the high voltage applied to the charge eliminating roller 71 by the charge eliminating power source 55 has the polarity opposite to the polarity of the voltage applied to the outer roller 9. The non-contact charge eliminating unit 56 disposed on the downstream side then removes, from the sheet P, electric charges not having been removed at the charge eliminating nip portion, and the sheet P is discharged out of the charge eliminating apparatus 57. Although the positional relation between the charge eliminating roller pair 50 and the first conveyance guide 53 and the second conveyance guide 54 is close in the example, the distances between these components are not prescribed.

Cooling Configuration of First Ionizer and Second Ionizer

Figure 4:
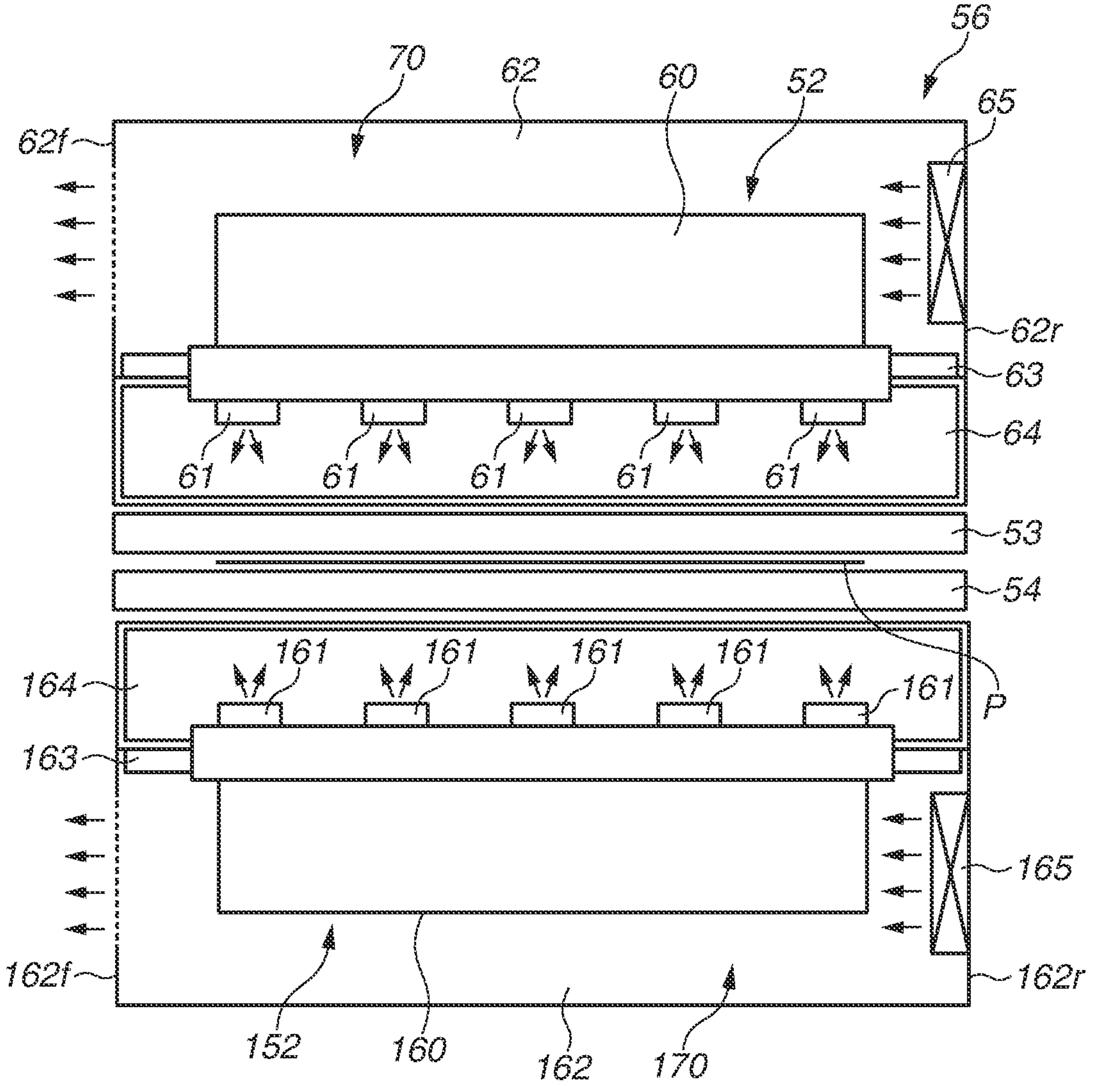
FIG. 4 schematically illustrates a non-contact charge eliminating unit viewed from a sheet conveyance direction.
Figure 5:
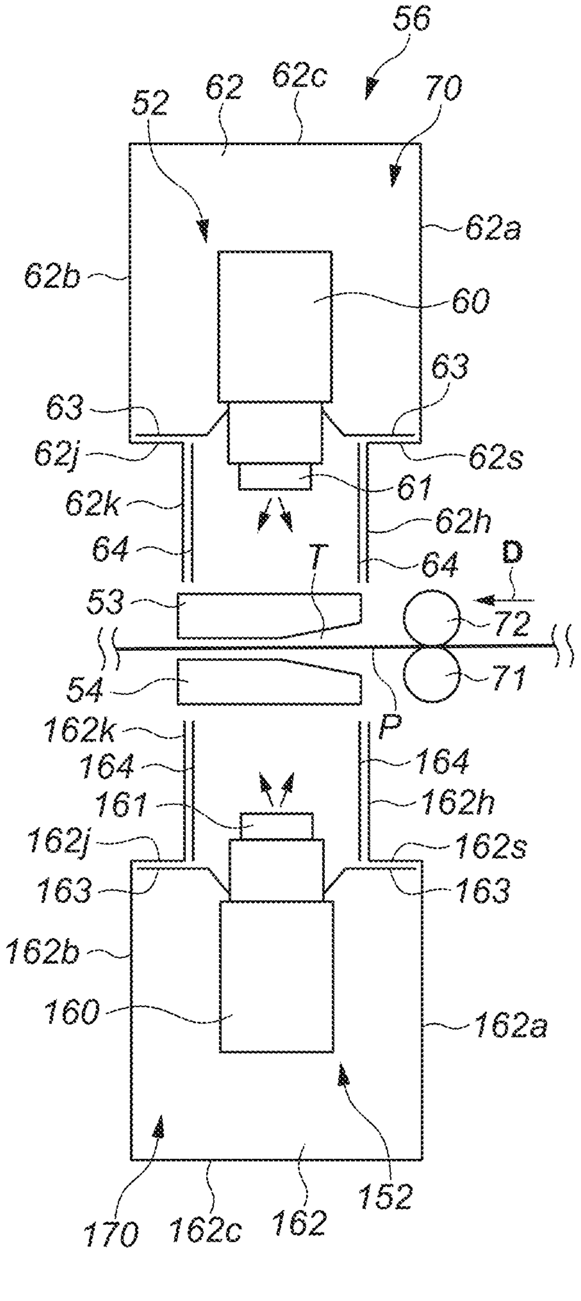
FIG. 5 schematically illustrates the non-contact charge eliminating unit viewed from a direction perpendicular to the sheet conveyance direction.

FIGS. 4 and 5 illustrate the non-contact charge eliminating unit 56 in detail. FIG. 4 illustrates the non-contact charge eliminating unit 56 viewed from the sheet conveyance direction D. FIG. 5 illustrates the non-contact charge eliminating unit 56 viewed from a direction perpendicular to the sheet conveyance direction D. The first ionizer 52 is disposed above the first conveyance guide 53, and the second ionizer 152 is disposed below the second conveyance guide 54.

The first ionizer 52 includes an ionizer control unit 60 and ion generation units (ion irradiation units) 61 for generating ions. The first ionizer 52 generates ions when the ion generation units 61 as electrode needles are applied with a high voltage. The ionizer control unit 60 includes a substrate for controlling the ion generation units 61 and a housing for supporting the substrate. The length of the first ionizer 52 in the sheet widthwise direction (front-rear direction of the charge eliminating apparatus 57) perpendicular to the sheet conveyance direction D is larger than the length of the first ionizer 52 in the sheet conveyance direction D. At the lower part of the first ionizer 52, a plurality of the ion generation units 61 is disposed in line in the sheet widthwise direction, as illustrated in FIG. 4. Alternatively, the ion generation unit 61 may be a single member.

The surrounding member 62 that surrounds the first ionizer 52 is disposed in the housing 157 of the charge eliminating apparatus 57 (see FIG. 2). As illustrated in FIG. 5, the surrounding member 62 includes a first side portion 62*a* facing one side surface of the first ionizer 52 and includes a second side portion 62*b* facing the other side surface of the first ionizer 52. The surrounding member 62 connects the first side portion 62*a* and the second side portion 62*b* and includes an upper portion 62*c* disposed above the first ionizer 52. The surrounding member 62 includes a vertically extending first wall 62*h* that is disposed vertically closer to the first conveyance guide 53 than the first side portion 62*a* is and that is upstream of the ion generation units 61 in the conveyance direction D. The surrounding member 62 includes a first connecting portion 62*s* for connecting the first wall 62*h* and the first side portion 62*a*. The surrounding member 62 includes a vertically extending second wall 62*k* that is disposed vertically closer to the first conveyance guide 53 than the second side portion

62*b* is and that is downstream of the ion generation units 61 in the conveyance direction D. The surrounding member 62 includes a second connecting portion 62*j* for connecting the second wall 62*k* and the second side portion 62*b*.

As illustrated in FIG. 4, the surrounding member 62 includes a back wall 62*r* disposed more on one side (back side of the charge eliminating apparatus 57) than the first ionizer 52 is in the sheet widthwise direction. The back wall 62*r* is provided with a first fan 65 for sending air toward the ionizer control unit 60 for the first ionizer 52. The surrounding member 62 further includes a front wall 62*f* disposed more on the other side (front side of the charge eliminating apparatus 57) than the first ionizer 52 is in the sheet widthwise direction. Air passing openings are formed on the front wall 62*f*.

The first fan 65 is configured to introduce fresh air to make an air flow along the sheet widthwise direction (longitudinal direction of the first ionizer 52) in the space where the ionizer control unit 60 is disposed. Air sent from the first fan 65 and having passed through the ionizer control unit 60 passes through the openings on the front wall 62*f*.

As illustrated in FIG. 5, one end of the sealing member 63 as a resin insulator is stuck on the first connecting portion 62*s* of the surrounding member 62. The sealing member 63 is a flexible or elastically deformable resin sheet. The sealing member 63 is provided so that the bent other end comes into contact with the first ionizer 52, in a deformed state. The sealing member 63 with one end in contact with the first ionizer 52 is also stuck on the second connecting portion 62*j*.

The sealing member 63, and the upper portion 62*c*, the first side portion 62*a*, and the second side portion 62*b* of the surrounding member 62 regulate an air passing space (first space) 70 through which the air from the fan 65 for cooling the ionizer control unit 60 passes. The ionizer control unit 60 as a part of the first ionizer 52 is disposed in the air passing space 70. The ionizer control unit 60 is thus cooled by the air flow generated by the first fan 65, in the air passing space 70.

The sealing member 63 as a separating portion spatially separates the ion generation units 61 and the air passing space 70 to prevent the air flowing in the air passing space 70 from drifting toward the ion generation units 61.

The resin sheets 64 are stuck on the inner surfaces of the first wall 62*h* and the second wall 62*k*. The resin sheet 64 is an example of a regulation member for regulating the space for connecting the ion generation units 61 and the conveyance path T (hereinafter this space is referred to as an ion passing space). The ions generated by the ion generation units 61 are radiated onto the sheet having passed through the ion passing space and then passing through the conveyance path T.

The lower side of the surrounding member 62 is open to allow the ion generation units 61 and the first conveyance guide 53 to communicate with each other. The ion generation units 61 and the conveyance path T communicate with each other via the opening 82 of the first conveyance guide 53.

The second ionizer 152 has the same configuration as the first ionizer 52. In other words, the second ionizer 152 includes an ionizer control unit 160 and ion generation units (ion irradiation units) 161. The second ionizer 152 generates ions by applying a high voltage to the ion generation units 161 as electrode needles. The length of the second ionizer 152 in the sheet widthwise direction (front-rear direction of the charge eliminating apparatus 57) perpendicular to the conveyance direction D is larger than the length of the second ionizer 152 in the sheet conveyance direction D. A plurality of the ion generation units 161 is disposed in line in the sheet widthwise direction at the upper part of the second ionizer 152, as illustrated in FIG. 4. Alternatively, the ion generation unit 161 may be a single member.

The second ionizer 152 is surrounded by the surrounding member 162 having the same configuration as the surrounding member 62 for the first ionizer 52. More specifically, the surrounding member 162 that surrounds the second ionizer 152 is disposed in the housing of the charge eliminating apparatus 57. The surrounding member 162 includes a first side portion 162*a* facing one side of the second ionizer 152 and includes a second side portion 162*b* facing the other side of the second ionizer 152. The surrounding member 162 connects the first side portion 162*a* and the second side portion 162*b* and includes a lower portion 162*c* positioned below the second ionizer 152.

The surrounding member 162 further includes a vertically extending first wall 162*h* that is disposed vertically closer to the second conveyance guide 54 than the first side portion 162*a* is and that is upstream of the ion generation units 161 in the conveyance direction D. The surrounding member 162 includes the first connecting portion 162*s* for connecting the first wall 162*h* and the first side portion 162*a*. The surrounding member 162 includes a vertically extending second wall 162*k* that is disposed vertically closer to the second conveyance guide 54 than the second side portion 162*b* is and that is downstream of the ion generation units 161 in the conveyance direction D. The surrounding member 162 includes a second connecting portion 162*j* for connecting the second wall 162*k* and the second side portion 162*b*.

As illustrated in FIG. 4, the surrounding member 162 includes a back wall 162*r* disposed more on one side (back side of the charge eliminating apparatus 57) than the second ionizer 152 is in the sheet widthwise direction. The back wall 162*r* is provided with the second fan 165 for sending air toward the ionizer control unit 160 for the second ionizer 152. The surrounding member 162 includes a front wall 162*f* disposed more on the other side (front side of the charge eliminating apparatus 57) than the second ionizer 152 is in the sheet widthwise direction. On the front wall 162*f*, air passing openings are formed. The second fan 165 is configured to introduce fresh air to make an air flow in the sheet widthwise direction along the ionizer control unit 160. Air sent from the second fan 165 and having passed through the ionizer control unit 160 passes through the openings on the front wall 162*f*.

As illustrated in FIG. 5, one end of the sealing member 163 as a resin insulator is stuck on the first connecting portion 162*s* of the surrounding member 162. The sealing member 163 is disposed so that the bent other end comes into contact with the second ionizer 152. The sealing member 163 with one end in contact with the second ionizer 152 is also stuck on the second connecting portion 162*j*.

The sealing member 163, and the lower portion 162*c*, the first side portion 162*a*, and the second side portion 162*b* of the surrounding member 162 regulate an air passing space 170 through which the air from the second fan 165 for cooling the ionizer control unit 160 passes.

The sealing member 163 as a separating portion spatially separates the ion generation units 161 and the air passing space 170 to prevent the air flowing in the air passing space 170 from drifting toward the ion generation units 161. The sealing member 163 as a flexible resin sheet is disposed to come into contact with the second ionizer 152.

The resin sheets 164 are stuck on the inner surfaces of the first wall 162*h* and the second wall 162*k*. The resin sheets 164 disposed on the first wall 162*h* and the second wall 162*k* form regulation members for regulating the ion passing space for connecting the ion generation units 161 and the conveyance path T.

The upper side of the surrounding member 162 is open to allow the ion generation units 161 and the second conveyance guide 54 to communicate with each other. The ion generation units 161 and the conveyance path T communicate with each other via the opening 83 of the second conveyance guide 54.

The ionizer control units 60 and 160 adjust the voltage according to a set charge eliminating amount to control electric charges to be generated by the ion generation units 61 and 161. These units need to be maintained at a predetermined temperature or lower to operate normally. The ionizers 52 and 152 according to the present exemplary embodiment need to be maintained at a temperature lower than 40° C.

In the charge eliminating apparatus 57, a sheet P heated by the fixing device 40 is continually conveyed.

The temperature inside the charge eliminating apparatus 57 may therefore rise by the sheet P and exceed the operating temperature ranges of the ionizer control units 60 and 160 depending on the operation environment (ambient temperature). Thus, the ionizer control units 60 and 160 need to be cooled to ensure the normal operation.

According to the present exemplary embodiment, the first fan 65 thus sends fresh air toward the ionizer control unit 60 to cool the ionizer control unit 60, and the second fan 165 sends fresh air toward the ionizer control unit 160 to cool the ionizer control unit 160.

If the fans 65 and 165 send air toward the ionizers 52 and 152, respectively, the following concern may arise. More specifically, if fresh air from the fan 65 or 165 flows in the space between the ion generation unit 61 or 161 and the sheet P in the conveyance path T, the ions generated by the ion generation unit 61 or 161 are assumed to drift because of the air flow from the fan 65 or 165, respectively. In this case, there is a concern that the ions may not reach the sheet, preventing the suitable sheet charge elimination.

According to the present exemplary embodiment, the sealing member 63 spatially separates the ion generation units 61 and the ionizer control unit 60, and the sealing member 163 spatially separates the ion generation units 161 and the ionizer control unit 160. More specifically, the air passing space 70, through which the air from the first fan 65 passes, and the ion generation units 61 are separated by the sealing member 63. Even in a state where the ionizer control unit 60 is cooled by the air flowing through the air passing space 70, the sealing member 63 can prevent the air flow of the fan 65 from adversely affecting the sheet charge elimination by the first ionizer 52. More specifically, the sealing member 63 enables preventing the air from adversely affecting the ion generation units 61 while ensuring the normal operation of the ionizer control unit 60. The sealing member 163 in contact with the second ionizer 152 also exhibits functions and effects similar to those of the sealing member 63.

As described above, one end of each of the sealing members 63 and 163 as flexible resin sheets are stuck on the surrounding members 62 and 162, and the bent other ends come into contact with the ionizers 52 and 152, respectively. Even if the positions of the ionizers 52 and 152 relative to the surrounding members 62 and 162 vary, the sealing members 63 and 163 are deformed by the positional variations, ensuring the allocation of the air passing spaces 70 and 170, respectively.

If a conductor exists in periphery, the ions generated by the ion generation units 61 are absorbed by the conductor and do not reach the sheet P, disturbing suitable sheet charge elimination. Since the surrounding member 62 according to the exemplary embodiment is made of a metal, the resin sheets (insulating members) 64 are stuck on the surfaces of the first wall **62*h* and the second wall 62*k*. The sealing member 63 and the conveyance guide 53 are also resin insulators. According to the present exemplary embodiment, members around the ion generation units 61 are thus made of insulators, allowing the ions to reliably reach the sheet P and enabling suitable sheet charge elimination. The above description of the first ionizer 52 also applies to the periphery of the ion generation units 161 of the second ionizer 152**.

The above-described exemplary embodiment is configured to prevent the conductor from being exposed by sticking the resin sheets 64 as insulators on the surrounding member 62 as a conductor. Alternatively, the first wall **62*h* and the second wall 62*k* in the surrounding member 62** may also be made of insulating members.

The configurations, functions, and effects of the above-described exemplary embodiment will be summarized below.

(1) The first fan 65 sends air to the first ionizer 52. This prevents the temperature rise of the first ionizer 52 and also prevents malfunctions due to the temperature rise of the first ionizer 52. In particular, when a high-temperature sheet having been subjected to the processing of the fixing device 40 passes through the charge eliminating apparatus 57, the sheet may cause the temperature rise of the first ionizer 52. If the first ionizer 52 is disposed in the housing of the charge eliminating apparatus 57, the temperature rise may possibly occur in the first ionizer 52. According to the present exemplary embodiment, the air from the first fan 65 enables maintaining the first ionizer 52 to the temperature, or lower, at which the first ionizer 52 can stably operate.

(2) The sealing member 63 for preventing the air from the first fan 65 from flowing toward the ion generation units 61 of the first ionizer 52 is disposed as a regulation member. If the air from the first fan 65 for preventing the temperature rise of the first ionizer 52 flows toward the ion generation units 61, the ions drift because of the air, possibly degrading the sheet charge eliminating capability. According to the present exemplary embodiment, the sealing member 63 regulates the air flow toward the ion generation units 61, making it possible to prevent the charge eliminating capability degradation. According to the exemplary embodiment, the sealing member 63 in contact with the first ionizer 52 is an example of a regulation member that can be elastically deformed to effectively limit the air flow toward the ion generation units 61. However, the regulation member is not limited to the sealing member 63. For example, the connecting portion **62*j* of the surrounding member 62 may be brought close to the first ionizer 52** for use as a regulation member.

(3) A part of the surrounding member 62 configures a duct through which the air from the first fan 65 passes. This allows the first ionizer 52 to be efficiently cooled by using the first fan 65.

(4) The first fan 65 and the surrounding member 62 are disposed so that the air from the first fan 65 flows along the longitudinal direction of the first ionizer 52. This allows the first ionizer 52 to be efficiently cooled by using the first fan 65.

(5) The sealing member 63 is disposed as a separating portion for separating the air passing space 70 where the air sent by the first fan 65 flows and the ion passing space where the ion generation units 61 are disposed. This enables preventing the charge eliminating capability degradation due to the air from the first fan 65. The separating portion is not limited to the elastically deformable sealing member 63. For example, the connecting portion 62_j_ of the surrounding member 62 may be brought close to the first ionizer 52 for use as a separating portion.

(6) The regulation member for regulating the ion passing space for connecting the ion generation units 61 and the conveyance path T for sheet passing is an insulator. Thus, the ions generated by the ion generation units 61 reliably reach the sheet passing through the conveyance path T.

The second ionizer 152 provides functions and effects similar to above (1) to (6) of the first ionizer 52.

Although, in the above-described exemplary embodiment, the back wall 62_r_ of the surrounding member 62 and the back wall of the housing 157 are different walls, the back wall 62_r_ of the surrounding member 62 may also serve as the back wall of the housing 157. Although, in the example, the front wall 62_f_ of the surrounding member 62 and the front wall of the housing 157 are different walls, the front wall 62_f_ of the surrounding member 62 may also serve as the front wall of the housing 157. Like the surrounding member 62, the back wall 162_r_ of the surrounding member 162 for the second ionizer 152 may also serve as the back wall of the housing 157. The front wall 162_f_ may also serve as the front wall of the housing 157.

Although, in the above-described exemplary embodiment, the surrounding member 62 is a single member, the surrounding member 62 may be formed by combining a plurality of members. For example, the member including the first side portion 62_a_, the second side portion 62_b_, and the upper portion 62_c_, the member including the first connecting portion 62_s_ and the second connecting portion 62_j_, and the member including the first wall 62_h_ and the second wall 62_k_ may also be different members. In this case, the member including the first connecting portion 62_s_ and second connecting portion 62_j_ and the member including the first wall 62_h_ and the second wall 62_k_ may be insulating members. Like the surrounding member 62, the surrounding member 162 for the second ionizer 152 may be formed by combining a plurality of members.

In the example, one end of the sealing member 63 is stuck on the first connecting portion 62_s_, and the other end of the sealing member 63 may be in contact with the first ionizer 52. However, one end of sealing member 63 may be stuck on the first ionizer 52, and the other end of the sealing member 63 may be in contact with the surrounding member 62.

Likewise, one end of the sealing member 163 for the second ionizer 152 may be stuck on the second ionizer 152, and the other end of the sealing member 163 may be in contact with the surrounding member 162.

In some embodiments, the sealing member 63 preferably seals the entire range in the sheet widthwise direction to prevent air flow toward the ion generation units 61. However, the sealing member 63 may seal at least the region where the ion generation units 61 are disposed in the sheet widthwise direction.

In the example, the elastically deformable sealing member 63 is used as a separating portion. However, for example, a resin plate may be provided as a separating portion to connect between the first ionizer 52 and the surrounding member 62 (or the surrounding member 162) and separate the air passing space 70 and the ion passing space where the ion generation units 61 are disposed, in a state where the sealing member 63 is not deformed. Likewise, a resin plate may also be provided as a separating portion instead of the sealing member 163 for the second ionizer 152.

Figure 7:
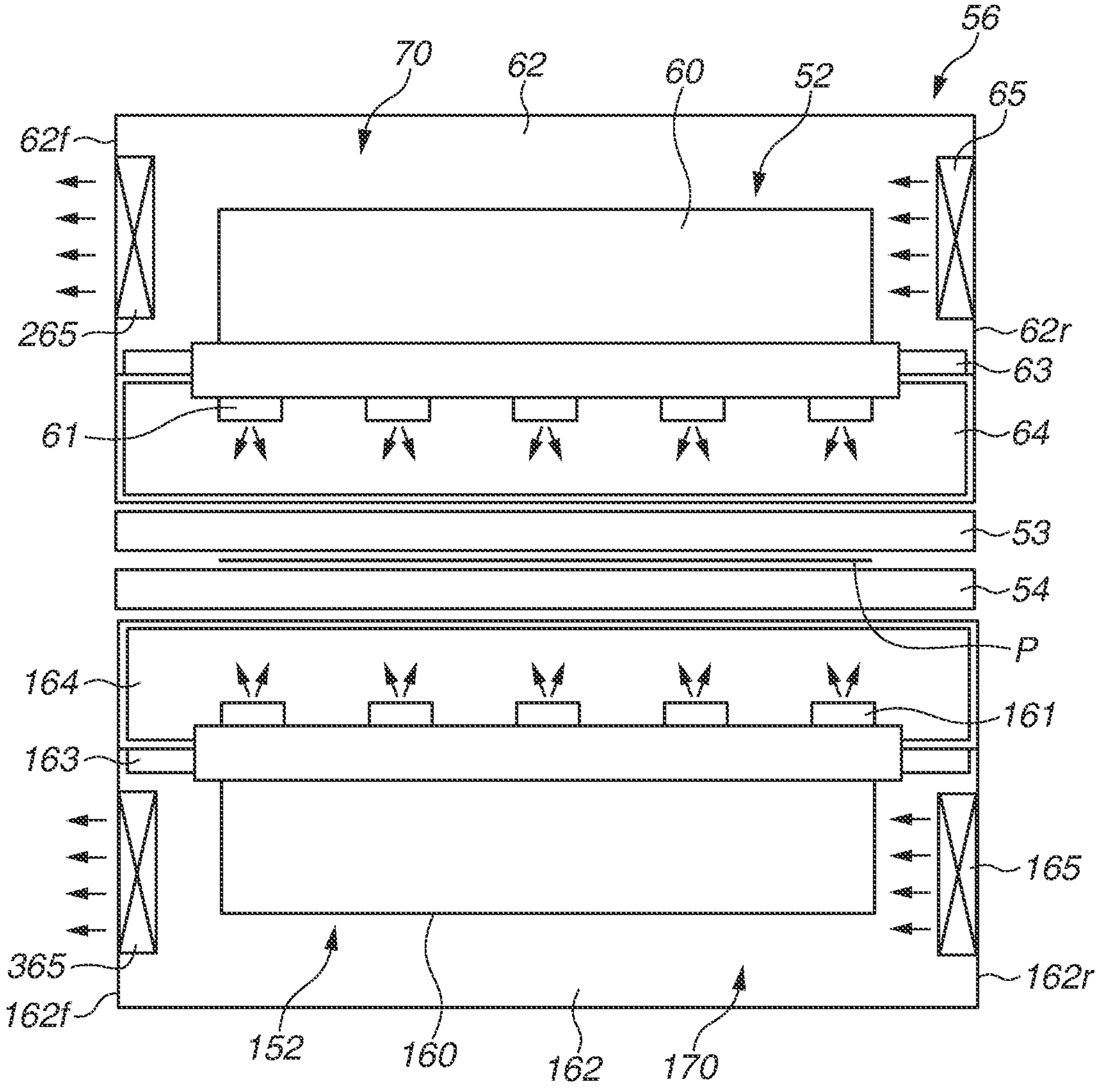
FIG. 7 illustrates a modification.

According to the above-described exemplary embodiment, the first fan 65 disposed as a blower fan on the back wall 62_r_ sends air toward the ionizer control unit 60 for the first ionizer 52. More specifically, the first ionizer 52 is disposed downstream of the first fan 65 in the ventilation direction. Like the modification illustrated in FIG. 7, a first exhaust fan 265 as another fan may be disposed on the front wall 62_f_, and a second exhaust fan 365 may be disposed on the front wall 162_f_. The first exhaust fan 265 also generates an air flow in the air passing space 70, like the first fan 65. The second exhaust fan 365 also generates an air flow in the air passing space 170, like the second fan 165.

To prevent the temperature rise of the first ionizer 52, only the first exhaust fan 265 may be provided without providing the first fan 65. To prevent the temperature rise of the second ionizer 152, only the second exhaust fan 365 may be provided without providing the second fan 165.

Although an electrophotographic image forming apparatus for forming an image on a sheet has been described above, an ink-jet image forming apparatus is also applicable.

The temperature rise in the charge eliminating unit is prevented by fans.

While the present disclosure has described exemplary embodiments, it is to be understood that some embodiments of the disclosure are not limited to the disclosed exemplary embodiments. The scope of the following claims is to be accorded the broadest interpretation so as to encompass all such modifications and equivalent structures and functions.

This application claims priority to Japanese Patent Application No. 2023-011454, which was filed on Jan. 30, 2023 and which is hereby incorporated by reference herein in its entirety.

What is claimed is:

1. A charge eliminating apparatus comprising:

a conveyance path configured to convey a sheet with an image formed thereon by an image forming apparatus;

a non-contact charge eliminating device having an ion generation unit configured to generate ions and a control unit configured to control the ion generation unit, the non-contact charge eliminating device being configured to remove charges from the sheet conveyed in the conveyance path in a non-contact state;

a surrounding member configured to surround the control unit;

a separating portion configured to separate a first space where the control unit is surrounded by the surrounding member and a second space where the ion generation unit is disposed; and a fan configured to generate an air flow in the first space.

2. The charge eliminating apparatus according to claim 1, wherein the surrounding member surrounds the ion generation unit.

3. The charge eliminating apparatus according to claim 1, wherein the surrounding member and the separating portion are ducts, and wherein the fan is disposed so that air sent by the fan flows through the ducts.

4. The charge eliminating apparatus according to claim 3, further comprising a housing, wherein the non-contact charge eliminating device and the ducts are disposed in the housing.

5. The charge eliminating apparatus according to claim 1, wherein the charge eliminating apparatus is configured so that air from the fan flows along a longitudinal direction of the non-contact charge eliminating device.

6. The charge eliminating apparatus according to claim 1, wherein the separating portion is an elastically deformable sealing member in contact with the surrounding member and the non-contact charge eliminating device.

7. The charge eliminating apparatus according to claim 6, wherein the sealing member as a sheet member is disposed so that one end of the sealing member is stuck on the surrounding member and the other end comes into contact with the non-contact charge eliminating device.

8. The charge eliminating apparatus according to claim 1, further comprising a regulation member for regulating a space for connecting the ion generation unit and the conveyance path, wherein the regulation member has an insulator.

9. The charge eliminating apparatus according to claim 8, further comprising a conveyance guide configured to form the conveyance path and have openings through which the ions generated by the ion generation unit pass, wherein the regulation member is disposed between the ion generation unit and the conveyance guide in a thickness direction of the conveyed sheet.

10. The charge eliminating apparatus according to claim 1, wherein the fan is a blower fan configured to send air toward the control unit.

11. The charge eliminating apparatus according to claim 10, further comprising another fan configured to generate an air flow in the first space, wherein the control unit is disposed between the blower fan and the another fan.

12. The charge eliminating apparatus according to claim 1, further comprising:

a second non-contact charge eliminating device configured to remove charges from the sheet conveyed in the conveyance path; and a second fan configured to send air toward the second non-contact charge eliminating device.

13. The charge eliminating apparatus according to claim 1, further comprising a charge eliminating roller pair configured to remove charges from the sheet conveyed in the conveyance path.

14. The charge eliminating apparatus according to claim 1, wherein the surrounding member has a shape formed of an upper portion, a side portion, and a lower side that is open where the conveyance path is disposed, and wherein the first space is regulated by the separating portion, the upper portion of the surrounding member, and the side portion of the surrounding member.

15. An image forming system comprising:

an image forming apparatus configured to form an image on a sheet; and a charge eliminating apparatus configured to remove charges from the sheet with the image formed thereon by the image forming apparatus, wherein the charge eliminating apparatus includes:

a conveyance path configured to convey the sheet with the image formed thereon by the image forming apparatus, a non-contact charge eliminating device having an ion generation unit configured to generate ions and a control unit configured to control the ion generation unit, the non-contact charge eliminating device being configured to remove charges from the sheet conveyed in the conveyance path in a non-contact state, a surrounding member configured to surround the control unit, a separating portion configured to separate a first space where the control unit is surrounded by the surrounding member and a second space where the ion generation unit is disposed, and a fan configured to generate an air flow in the first space.

16. The image forming system according to claim 15, wherein the image forming apparatus comprises:

a transfer unit configured to transfer a toner image onto the sheet; and a fixing unit configured to thermally fix to the sheet the toner image transferred onto the sheet.

* * * * *